US011035689B2

(12) United States Patent
Nara et al.

(10) Patent No.: US 11,035,689 B2
(45) Date of Patent: Jun. 15, 2021

(54) INFORMATION PROCESSING DEVICE, AUTOMATIC PLAYING METHOD OF CONTENT

(71) Applicant: Clarion Co., Ltd., Saitama (JP)

(72) Inventors: Norikazu Nara, Saitama (JP); Noriyuki Abe, Saitama (JP); Takashi Matsumoto, Tokyo (JP); Akihiro Kondo, Tokyo (JP); Makoto Orino, Hitachi (JP); Takaaki Yashiro, Hitachi (JP)

(73) Assignee: CLARION CO., LTD., Saitama (JP)

( * ) Notice: Subject to any disclaimer, the term of this patent is extended or adjusted under 35 U.S.C. 154(b) by 315 days.

(21) Appl. No.: 16/040,995

(22) Filed: Jul. 20, 2018

(65) Prior Publication Data
US 2019/0025072 A1 Jan. 24, 2019

(30) Foreign Application Priority Data

Jul. 21, 2017 (JP) .............................. JP2017-142175

(51) Int. Cl.
*G01C 21/36* (2006.01)
*G06F 11/34* (2006.01)
(Continued)

(52) U.S. Cl.
CPC ......... *G01C 21/3641* (2013.01); *G06F 16/29* (2019.01); *G06F 16/955* (2019.01);
(Continued)

(58) Field of Classification Search
CPC ................ G01C 21/3641; G01C 21/36; H04N 21/4524; H04N 21/4532; H04N 21/44204;
(Continued)

(56) References Cited

U.S. PATENT DOCUMENTS 6,847,885 B2 * 1/2005 Sato .................... G01C 21/26
701/465
7,709,723 B2 * 5/2010 Pachet .................... G10H 7/02
84/603

(Continued)

FOREIGN PATENT DOCUMENTS

DE 10 2013 225269 6/2015
JP 2001-282847 A 10/2001
(Continued)

OTHER PUBLICATIONS

Automated Demand Response Framework in ELNs: Decentralized Scheduling and Smart Contract; Xiaodong Yang et al.; IEEE Transactions on Systems, Man, and Cybernetics: Systems; vol. 50, Issue 1; Journal Article; Publisher: IEEE; Year 2020.*

(Continued)

*Primary Examiner* — Cuong H Nguyen
(74) *Attorney, Agent, or Firm* — Lewis Roca Rothgerber Christie LLP

(57) ABSTRACT

An information processing device is installed in a vehicle and comprises an action history DB which stores a plurality of action histories including a combination of a content that was played based on an instruction of a user and a situation in which the content was played, and an automatic playing unit which, when a current elapsed time as an elapsed time from a time that an ignition switch of the vehicle was most recently turned ON or a current travel distance as a travel distance from a time that an ignition switch of the vehicle was most recently turned ON matches any one of the action histories of the action history DB, plays a content included in the matching action history.

14 Claims, 8 Drawing Sheets

(51) Int. Cl.
 *G06F 16/29* (2019.01)
 *G06F 16/955* (2019.01)
 *H04N 21/414* (2011.01)
 *H04N 21/458* (2011.01)
 *H04N 21/466* (2011.01)
 *H04N 21/442* (2011.01)
 *H04N 21/45* (2011.01)

(52) U.S. Cl.
 CPC . *H04N 21/41422* (2013.01); *H04N 21/44204* (2013.01); *H04N 21/44213* (2013.01); *H04N 21/44218* (2013.01); *H04N 21/44222* (2013.01); *H04N 21/458* (2013.01); *H04N 21/4524* (2013.01); *H04N 21/4532* (2013.01); *H04N 21/4667* (2013.01); *H04N 21/4668* (2013.01)

(58) Field of Classification Search
 CPC ........... H04N 21/4667; H04N 21/4668; H04N 21/44218; G06F 16/29; G06F 11/34
 USPC .......... 701/456, 36, 117; 709/226, 228, 234; 707/722, E17.009, E17.101; 700/94
 See application file for complete search history.

(56) References Cited

U.S. PATENT DOCUMENTS

| | | | | |
|---|---|---|---|---|
| 7,957,837 | B2* | 6/2011 | Ziegler | G16H 20/00 700/258 |
| 8,035,023 | B2* | 10/2011 | Hernandez | G06F 16/632 84/615 |
| 8,285,654 | B2* | 10/2012 | Bajrach | G11B 27/031 706/14 |
| 8,897,904 | B2* | 11/2014 | Muench | H04N 21/42202 700/94 |
| 10,474,716 | B2* | 11/2019 | Kreifeldt | H04L 65/60 |
| 2003/0114968 | A1* | 6/2003 | Sato | G01C 21/26 701/36 |
| 2006/0074649 | A1* | 4/2006 | Pachet | G10H 1/0066 704/229 |
| 2009/0254836 | A1* | 10/2009 | Bajrach | G11B 27/031 715/745 |
| 2010/0063726 | A1* | 3/2010 | Marjenberg | G01C 21/00 701/408 |
| 2010/0312369 | A1* | 12/2010 | Dollar, Jr. | G06F 16/68 700/94 |
| 2011/0054646 | A1* | 3/2011 | Hernandez | G06F 16/632 700/94 |
| 2012/0002515 | A1* | 1/2012 | Muench | H04N 21/4668 369/30.03 |
| 2012/0054054 | A1 | 3/2012 | Kameyama | |
| 2014/0281971 | A1* | 9/2014 | Isbell, III | H04N 21/42202 715/716 |
| 2015/0032364 | A1* | 1/2015 | Yamaguchi | G01C 21/3629 701/400 |
| 2015/0160019 | A1* | 6/2015 | Biswal | B60W 50/00 701/1 |
| 2015/0287121 | A1* | 10/2015 | Nakamura | G06Q 30/0282 701/537 |
| 2016/0025497 | A1* | 1/2016 | Baalu | H04L 67/12 701/430 |
| 2016/0196345 | A1* | 7/2016 | Kreifeldt | G06F 16/287 707/738 |
| 2017/0095852 | A1 | 4/2017 | Carstens et al. | |
| 2017/0270433 | A1* | 9/2017 | Tsubouchi | G06N 7/005 |

FOREIGN PATENT DOCUMENTS

| | | |
|---|---|---|
| JP | 2009-230334 A | 10/2009 |
| JP | 2010-277510 A | 12/2010 |
| JP | 2012-018175 A | 1/2012 |
| JP | 2012-53593 A | 3/2012 |
| JP | 2012-123490 A | 6/2012 |
| JP | 2015-056045 A | 3/2015 |
| WO | WO 2015/086302 A1 | 6/2015 |
| WO | WO 2017/095852 A1 | 6/2017 |

OTHER PUBLICATIONS

Xiaodong Yang et al. "Automated Demand Response"; Framwork in ELNs: Decentralized Scheduling and Smart Contract; IEEE Transactions on systems, Man, and Cybernetics Systems, vol. 50, No. 1, (printed: Jan. 2020).*
Extended European Search Report dated Sep. 4, 2018 issued in European counterpart application No. 18184639.5.
Belimpasakis et al : "Experience Explorer: A Life-Logging Platform Based on Mobile Context Collection", Third International Conference on Next Generation Mobile Applications, Services and Technologies, 2009. Ngmast '09., IEEE, Piscataway, NJ, USA, Sep. 15, 2009 (Sep. 15, 2009), pp. 77-82.
Japanese Office Action dated Apr. 6, 2021 regarding Japanese Patent Application No. 2017-142175 corresponding to U.S. Appl. No. 16/040,995 (6 pages) with English Translation (6 pages).

* cited by examiner

FIG.2

| ACTION HISTORY DB | | | | | | |
|---|---|---|---|---|---|---|
| DATE/ TIME | DEPAR- TURE PLACE | DESTI- NATION | PLAYED CONTENT | TRAVEL DISTANCE | PLAYING START LOCATION | CANCEL |
| 2017/4/1 10:35 | HOME | WORK- PLACE | LATEST NEWS | · | · | NO |
| 2017/4/3 9:20 | 35.xx, 139.xx | 35.xx, 139.xx | TOMORROW'S WEATHER | · | · | YES |
| · | · | · | · | · | · | · |

FIG.3

| CONTENT DB ||||| 
|---|---|---|---|---|
| NAME | CATEGORY | LENGTH | RELATED POSITION | CONTENT BODY |
| LATEST NEWS | NEWS | 10 MIN. | NONE | ... |
| LOCAL NEWS | NEWS | 5 MIN. | P1 | ... |
| ... | ... | ... | ... | ... |
| POI NEWS | NEWS | 2 MIN. | P2 | ... |
| POI NEWS | NEWS | 2 MIN. | P3 | ... |
| ... | ... | ... | ... | ... |
| TOMORROW'S WEATHER | WEATHER FORECAST | 3 MIN. | P4 | ... |
| ... | ... | ... | ... | ... |

FIG.6A

| DESTINATION | CONTENT |
|---|---|
| A1 | N1 |
| A2 | N2 |
| A3 | M1 |
| B1 | M2 |
| B2 | W1 |
| B3 | N3 |
| B4 | M3 |
| C1 | W2 |
| C2 | N4 |
| C3 | M4 |

FIG.6B

| DESTINATION CLASSI-FICATION | CONTENT CLASSI-FICATION | TOTAL NUMBER | CORRE-SPONDENCE (YES/NO) |
|---|---|---|---|
| A | N | 2 | YES |
| A | M | 1 | — |
| A | W | 0 | — |
| B | N | 1 | — |
| B | M | 2 | YES |
| B | W | 1 | — |
| C | N | 1 | — |
| C | M | 1 | — |
| C | W | 1 | — |

(b)

INFORMATION PROCESSING DEVICE, AUTOMATIC PLAYING METHOD OF CONTENT

CROSS-REFERENCE TO RELATED APPLICATION

This application claims priority to Japanese Patent Application No. 2017-142175, filed Jul. 21, 2017, the contents of which are herein incorporated by reference.

TECHNICAL FIELD

The present invention relates to an information processing device, and an automatic playing method of contents.

BACKGROUND ART

There are extensive needs for viewing or listening to contents while riding a vehicle. Because it is now possible to access a large quantity of contents even from within the vehicle due to advancements in digital technology, passengers of a vehicle can view or listen to arbitrary contents at an arbitrary timing. Nevertheless, the selection of contents is troublesome for a person driving the vehicle.

PTL 1 (Japanese Unexamined Patent Application Publication No. 2010-277510) discloses a content list presentation control system comprising at least one information terminal to be operated by a user, and an information management device, wherein the information terminal includes first output means for outputting a content containing at least one among a text string, an image, and a sound, second output means for outputting a content list, operation means for receiving, from the user, an instruction related to the content including an output instruction of the content list, and sending processing means which performs processing for sending the operation information including a type of instruction received by the operation means and specific information for specifying the content subject to the instruction, wherein the information management device includes accumulation means for accumulating operation history data corresponding to the operation information sent from the sending processing means, and presentation determination means for determining whether a content list can be presented regarding the target content by determining whether the content subject to the output instruction of the content list is related to a content which was previously viewed or listened by the user by using the user's past operation history data accumulated in the accumulation means, wherein the information terminal further includes presentation control means for controlling the presentation of the content list regarding the target content according to the determination result of the presentation determination means.

SUMMARY OF INVENTION

Technical Problem

With the invention described in PTL 1, it is not possible to automatically play contents at an appropriate timing.

Solution to Problem

The information processing device according to the first mode of the present invention is an information processing device installed in a vehicle, comprising: an action history DB which stores a plurality of action histories as a combination of a content that was played based on an instruction of a user and a situation in which the content was played; and an automatic playing unit which, when a current elapsed time as an elapsed time from a time that an ignition switch of the vehicle was most recently turned ON or a current travel distance as a travel distance from a time that an ignition switch of the vehicle was most recently turned ON matches any one of the action histories of the action history DB, plays a content included in the matching action history.

The automatic playing method of a content according to the second mode of the present invention is an automatic playing method of a content executed by an information processing device which is installed in a vehicle and comprises an action history DB which stores a plurality of action histories as a combination of a content that was played based on an instruction of a user and a situation in which the content was played, wherein, when a current elapsed time as an elapsed time from a time that an ignition switch of the vehicle was most recently turned ON or a current travel distance as a travel distance from a time that an ignition switch of the vehicle was most recently turned ON matches any one of the action histories of the action history DB, a content included in the matching action history is played.

Advantageous Effects of Invention

According to the present invention, contents can be automatically played at an appropriate timing.

BRIEF DESCRIPTION OF DRAWINGS

FIG. 2 is a diagram showing an example of the action history DB 22.

FIG. 3 is a diagram showing an example of the content DB 23.

FIG. 6A is a table showing the fields of the history DB 22 that received a cancel operation during automatic playing.

FIG. 6B is a table showing a count result of the cancel operation.

DESCRIPTION OF EMBODIMENTS

First Embodiment

The first embodiment of the information processing device according to the present invention is now explained with reference to FIG. 1 to FIG. 6B. While this embodiment will explain a case where the information processing device is installed in a vehicle, the information processing device may be removed from the vehicle. Moreover, in the ensuing explanation, the vehicle equipped with the information processing device is referred to as the "own vehicle", and a person riding the own vehicle is referred to as the "user".

Figure 1:
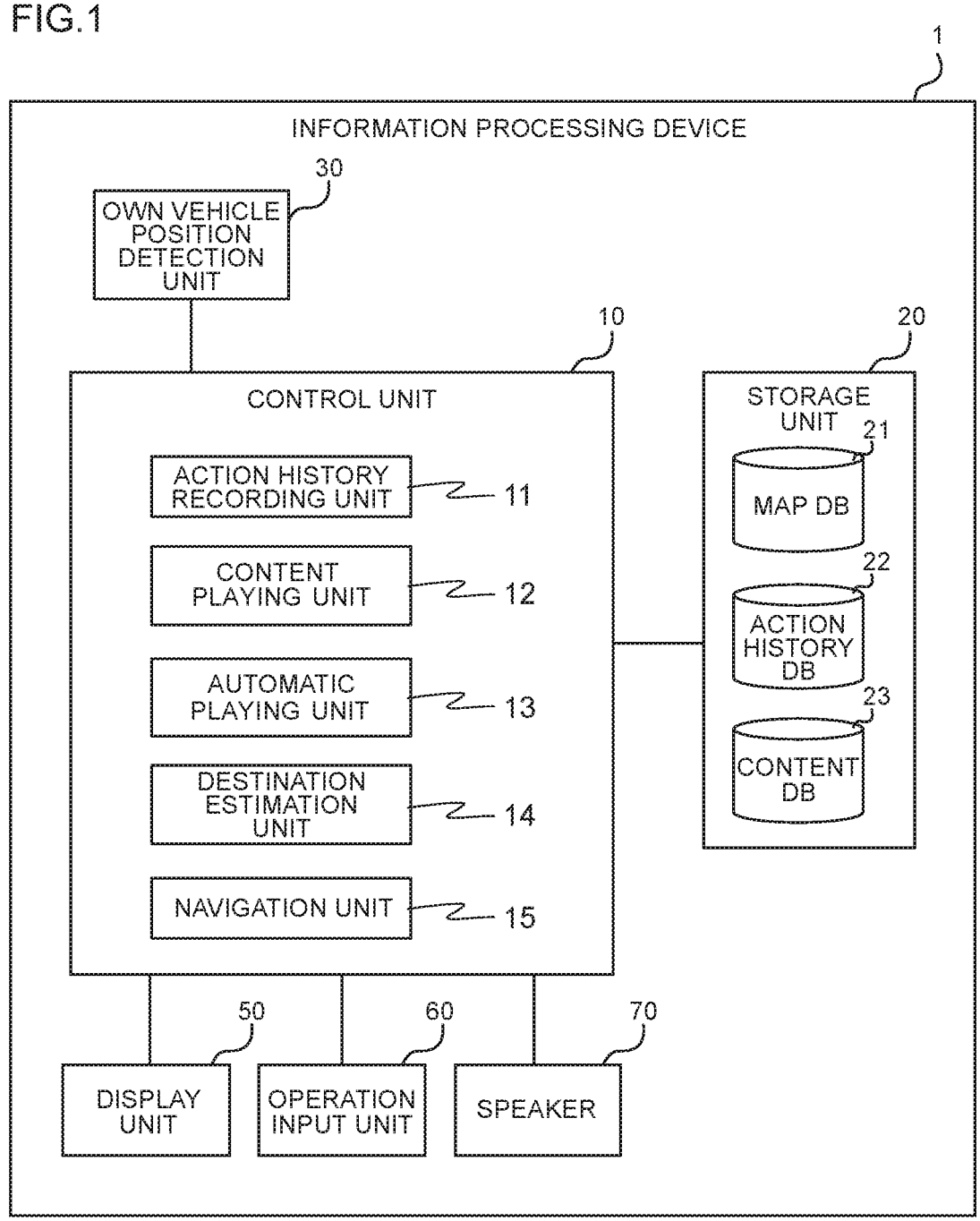
FIG. 1 is a configuration diagram of the information processing device 1 according to the first embodiment.

FIG. 1 is a configuration diagram of the information processing device 1 according to the first embodiment of the present invention. The information processing device 1 shown in FIG. 1 comprises a control unit 10, a storage unit 20, an own vehicle position detection unit 30, a display unit 50, an operation input unit 60, and a speaker 70.

The control unit 10 is configured from a CPU, a ROM, a RAM and the like (all not shown), and performs various types of processing and computing for operating the information processing device 1. The control unit 10 includes, as its functions, various functional blocks such as an action history recording unit 11, a content playing unit 12, an automatic playing unit 13, a destination estimation unit 14, and a navigation unit 15. The control unit 10 can realize these functional blocks, for instance, by reading the programs stored in the ROM into the RAM and executing the programs with the CPU. The overview of the respective functional blocks is as follows.

The action history recording unit 11 writes data into an action history DB 22. The content playing unit 12 reads a content selected by a user or the automatic playing unit 13 from a content DB 23, and plays the content using the display unit 50 and the speaker 70. The automatic playing unit 13 selects a content as described above and causes the content playing unit 12 to play the content. Moreover, the automatic playing unit 13 also writes data into the action history DB 22. The destination estimation unit 14 estimates a destination of a user based on a current location, a current time, and information stored in the action history DB 22. The navigation unit 15 calculates a travel route from the current location to the destination, and a remaining time until reaching the destination. When the user inputs a destination by using the operation input unit 60, the foregoing destination is the destination input by the user, but when a destination is not input by the user, the destination is estimated by the destination estimation unit 14. Moreover, the navigation unit 15 may acquire information related to traffic congestion from the outside via a communication unit (not shown) in the calculation of the remaining time until reaching the destination, and give consideration to such information upon performing the calculation.

The storage unit 20 is a nonvolatile storage medium and is configured, for example, by using a hard disk drive, a solid state drive, a memory card or the like. The storage unit 20 includes various databases such as a map DB 21, an action history DB 22, and a content DB 23. Details of these databases will be explained later.

The own vehicle position detection unit 30 receives radio waves from a plurality of satellites configuring a satellite navigation system, and, by analyzing the signal included in the radio waves, calculates the location of the own vehicle; that is, the latitude and the longitude. The own vehicle position detection unit 30 outputs the calculated latitude and longitude to the control unit 10.

The display unit 50 is a display device, such as a liquid crystal display, which presents video information to the user. The speaker 70 provides sound information to the user. The content DB 23 stores contents, and such contents are played using the display unit 50 and the speaker 70. The operation input unit 60 is, for example, a button that is operated by the user. By operating the operation input unit 60, the user can input the destination, select the content, and stop the playing of the content that is being automatically played. In the ensuing explanation, the user's operation of stopping the playing the content that is being automatically played is hereinafter referred to as the "cancel operation", and the instruction of stopping the automatic playing based on the cancel operation is hereinafter referred to as the "cancel instruction". The display unit 50 and the operation input unit 60 may also be configured integrally as a touch panel which enables touch operations.

(Map DB 21)

The map DB 21 is a database which stores information of the road on which the vehicle is traveling, and the name and location of the POI (Point Of Interest) that may be set as the destination. In this embodiment, the map DB 21 is mainly referenced by the navigation unit 15, and is used for calculating the travel route to the destination, and for calculating the remaining time until reaching the destination. Note that, while not specifically explained in this embodiment, information stored in the map DB 21 may be updated as needed via a communication unit (not shown).

(Action History DB 22)

The configuration of the action history DB 22 is now explained with reference to FIG. 2. The action history DB 22 stores, as records, action histories respectively including a combination of the content that was played based on the user's instruction and the situation in which the content was played. Each record of the action history DB 22 comprises the fields of date/time, departure place, destination, played content, travel distance, playing start location, and cancel. In other words, among the respective fields of the action history DB 22, the played content is the content that was played based on the user's instruction, and the date/time, the destination, the travel distance, and the playing start location show the situation that the content was played. The cancel field will be explained later. Information stored in the respective fields is as follows.

The date/time field stores the date/time that the record was recorded; that is, the date/time that the content was played by the user. Note that, the date/time written in the cancel field is unrelated to the value of the date/time field. The departure place field stores information of the location where the ignition switch of the own vehicle was most recently turned ON. This information may be the name of the POI or the latitude and the longitude. The destination field stores the destination that was input by the user from the operation input unit 60 when the content was played. Note that, when the user did not set the destination when the content was played, the destination estimated by the destination estimation unit 14 is stored. Note that, when the destination estimation unit 14 is unable to estimate the destination, the location where the ignition switch of the own vehicle was turned OFF after the content was played is recorded as the destination. The destination may be the name of the POI or the latitude and the longitude.

The played content field stores information for identifying the content played by the user. The travel distance field stores the distance that the own vehicle had traveled from the time that the ignition switch was most recently turned ON to the time that the content was played. The playing start location field stores the location where the content playing instruction was received from the user. The cancel field stores information showing whether or not a cancel instruction was received from the user.

(Content DB 23)

The configuration of the content DB 23 is now explained with reference to FIG. 3. The content DB 23 is a database which stores information related to the contents. Note that, while not specifically explained in this embodiment, information stored in the content DB 23 may be updated as needed via a communication unit (not shown). The content DB 23 is configured from a plurality of records, and the respective records include the fields of name, category, length, related position, and content body. Details of the information stored in the respective fields are as follows.

The name field stores the name of the content. The name of the content is, for example, latest news, local news, POI news, tomorrow's weather, weekly weather forecast, or the like. Note that POI news is news related to the POI. The category field stores the category of the content. The category of the content is, for example, news, weather forecast, or the like. The length field stores the playing time of the content; that is, the time from the start of the playing of the content to the completion of such playing. The related position field stores information of the location related to the content; for example, information indicating the combination of latitude and longitude, POI, or area. The content body field stores the content itself. The content itself is video data, sound data, or text data. Text data may be displayed as is as text information on the display unit 50, or output as sound from the speaker 70 by using the known read-aloud function. Note that, the content body may also be received from the outside via a communication device (not shown), and the content body does not need to be stored in the content DB 23.

(Action History Recording Unit 11)

When the user uses the operation input unit 60 and selects the content, the action history recording unit 11 stores the current date/time, the departure place, the destination, the title of the played content, the travel distance, and the playing start location in the action history DB 22. The information recorded by the action history recording unit 11 in the action history DB 22 is a value other than the value of the "cancel" field in each record of the action history DB 22.

(Destination Estimation Unit 14)

The destination estimation unit 14 estimates the destination of the vehicle when the destination has not been input by the user. The destination is estimated by the destination estimation unit 14 as follows. In other words, the destination estimation unit 14 refers to the action history DB 22, and searches for a record that is closest to the current situation from the perspective of time and location. Specifically, the destination estimation unit 14 calculates the evaluated value of all records of the action history DB 22. The evaluated value is the sum of the value obtained by multiplying the difference between the time in the date/time field and the current time by the first coefficient and the value obtained by multiplying the difference between the value of the departure place field and the current location by the second coefficient. The destination estimation unit 14 uses the value of the destination field in the record with the lowest evaluated value as the estimated destination. Note that, the destination estimation unit 14 may also calculate the day of the week from the date stored in the date/time field in each record of the action history DB 22 and the value of the first coefficient may be set to be small for a record which matches the current day of the week.

(Automatic Playing Unit 13)

Figure 4:
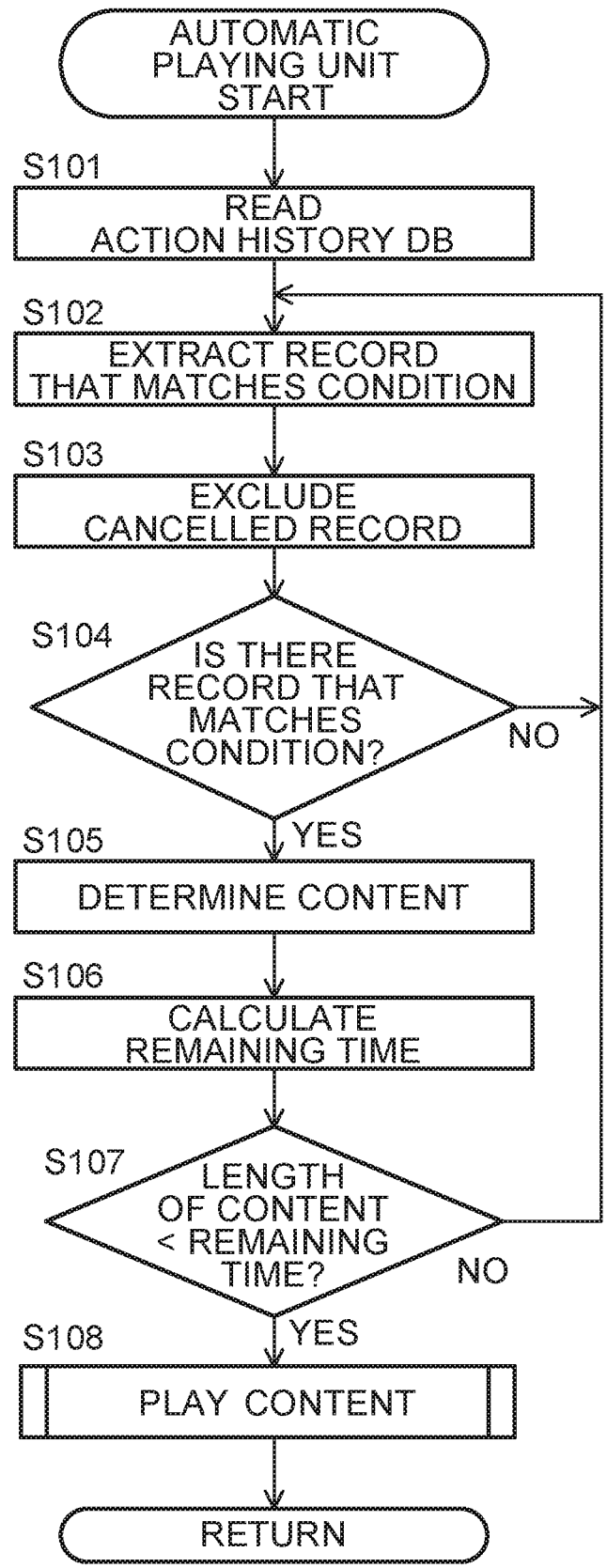
FIG. 4 is a flowchart showing an operation of the automatic playing unit 13.

FIG. 4 is a flowchart showing the operation of the automatic playing unit 13. The automatic playing unit 13 constantly performs the operation shown in FIG. 4 when the content playing unit 12 is not operating.

Foremost, in S101, the automatic playing unit 13 reads the action history DB 22. In subsequent S102, the automatic playing unit 13 collects the current information of the own vehicle and extracts records from the action history DB 22 with matching conditions. The term "condition" is one of the following first to fourth conditions. Specifically, the first condition is that the current travel distance and the travel distance of the record are a match. Note that, the current travel distance is the distance that the own vehicle travelled from the time that the ignition switch was most recently turned ON to the current time. The second condition is that the current travel distance and the travel distance of the record are a match, and that the current time and the time period of the date/time of the record are a match. The term "time period" is the time obtained by dividing 1 day into 2 or more time periods. The third condition is that the current travel distance and the travel distance of the record are a match, and that the current destination and the destination of the record are a match. Note that, this destination may be the destination that is input by the user through the operation input unit 60, or the destination estimated by the destination estimation unit 14. The fourth condition is that the current travel distance and the travel distance of the record are a match, and that the current departure place and the departure place of the record are a match. Note that, the term "match" in the first condition to the fourth condition does not only refer to the cases of a strict match, and also includes cases where the difference falls within a predetermined range.

In subsequent S103, the automatic playing unit 13 excludes the records in which the cancel field is "Yes" from the records extracted in S102; that is, the records in which the playing has been previously cancelled by the user. In subsequent S104, the automatic playing unit 13 determines whether there is a record that matches the condition; that is, a record which was extracted in S102 and which was not excluded in S103. The automatic playing unit 13 proceeds to S105 upon obtaining a positive determination, and returns to S102 upon obtaining a negative determination. In S105, the automatic playing unit 13 determines the content to be played. When only one record matches the condition, the automatic playing unit 13 determines the content indicated in that record as the content to be played, and, when there are a plurality of records that match the condition, determines the content indicated in one of the records as the content to be played. In S106, the automatic playing unit 13 causes the navigation unit 15 to calculate the remaining time; that is, the remaining time until reaching the destination.

In subsequent S107, the automatic playing unit 13 determines whether the remaining time calculated in S106 is longer than the length of the content determined in S105. The automatic playing unit 13 proceeds to S108 upon determining that the remaining time is longer, and returns to S102 upon determining that the remaining time is less than the length of the content. In subsequent S108, the automatic playing unit 13 performs the content playing processing, and ends the processing shown in FIG. 4. The details of S108 will be explained in subsequent FIG. 5.

Figure 5:
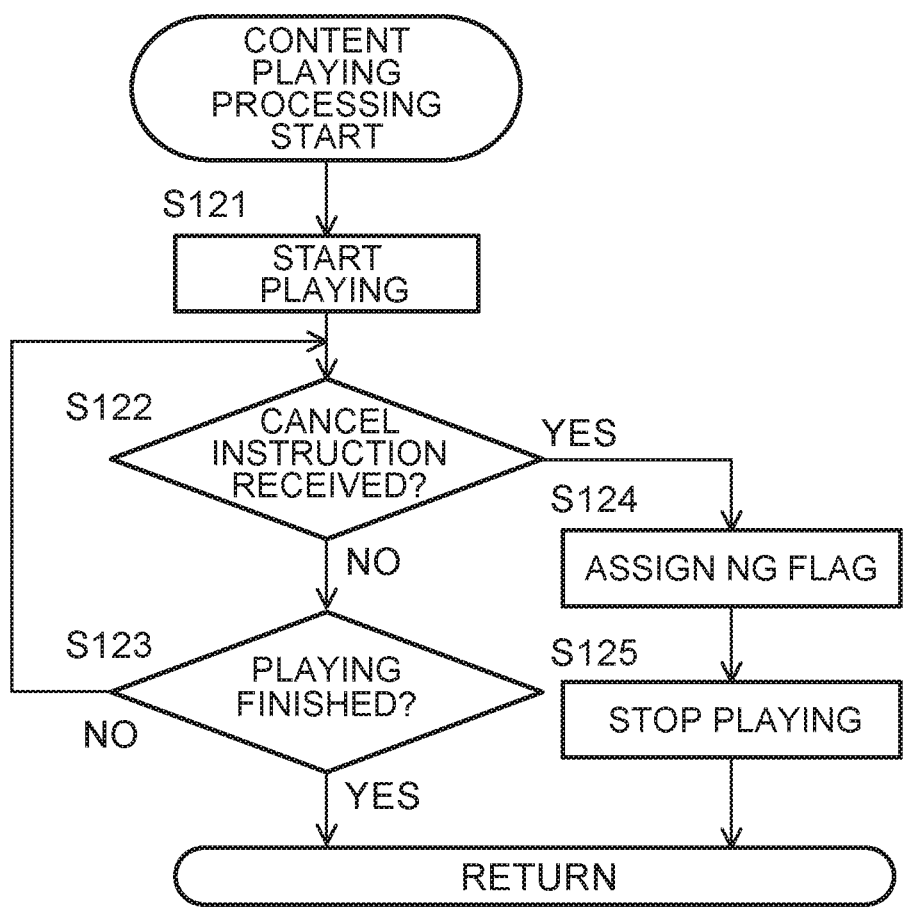
FIG. 5 is a flowchart showing the details of the content playing processing performed in the first embodiment.

FIG. 5 is a flowchart showing the details of S108 in FIG. 4; that is, the content playing processing. In FIG. 5, the automatic playing unit 13 in S121 foremost starts the playing of the content determined in S105 of FIG. 4. In subsequent S122, the automatic playing unit 13 determines whether a cancel instruction was received from the operation input unit 60. The automatic playing unit 13 proceeds to S124 upon determining that a cancel instruction was received, and proceeds to S123 upon determining that a cancel instruction was not received. In S123, the automatic playing unit 13 determines whether the playing of the content started in S121 has finished; that is, whether the content has been played to the end. The automatic playing unit 13 ends the processing shown in FIG. 5 upon determining that the playing of the content has ended, and returns to S122 upon determining that the playing of the content has not ended. In S124, the automatic playing unit 13 assigns an NG flag to the record indicating the content selected in S105 of FIG. 4; that is, indicates "Yes" in the "cancel" field. In subsequent S125, the automatic playing unit 13 stops (suspends) the playing of the content, and ends the processing shown in FIG. 5.

The following effects are yielded according to the first embodiment described above.

(1) The information processing device 1 is installed in a vehicle, and comprises an action history DB 22 which stores a plurality of action histories which are a combination of a content that was played based on an instruction of a user and a situation in which the content was played, and an automatic playing unit 13 which, when a current elapsed time as an elapsed time from a time that an ignition switch of the vehicle was most recently turned ON or a current travel distance as a travel distance from a time that an ignition switch of the vehicle was most recently turned ON matches any one of the action histories of the action history DB 22, plays a content included in the matching action history. The information processing device 1 is thereby able to automatically play the content at an appropriate timing.

(2) The information processing device 1 comprises an operation input unit 60 capable of receiving an input from the user. When the operation input unit 60 receives an input while the content is being played, the automatic playing unit 13 suppresses the playing of the content. The information processing device 1 is thereby able to automatically play the content at an appropriate timing in accordance with the user's preference.

(3) When the operation input unit 60 receives a cancel operation input from the user while the content is being played based on a first action history among the plurality of action histories stored in the action history DB 22, the automatic playing unit 13 does not play the content based on the first action history. The information processing device 1 is thereby able to automatically play the content at an appropriate timing in accordance with the user's preference by not reproducing the content in a situation where the user has cancelled the automatic playing.

(4) The automatic playing unit 13 comprises a navigation unit 15 which calculates the remaining time until arrival as a time until reaching a destination. The automatic playing unit 13 plays the content when the length of the content to be played is shorter than the remaining time until arrival. The information processing device 1 can thereby automatically play only the content in which the playing will be completed before reaching the destination.

(5) The action history DB 22 includes the departure place of the vehicle. When the current travel distance and the departure place of the vehicle match any one of the action histories of the action history DB 22, the automatic playing unit 13 plays the content included in the matching action history. The information processing device 1 is thereby able to automatically play the content that was previously played when the departure place is the same and the distance from the departure place is also the same.

Modified Example 1

In the first embodiment described above, the travel distance field in the action history DB 22 may be substituted with the travel time field. The travel time field stores the time that the own vehicle had traveled until the content was played from the time that the ignition switch was most recently turned ON. In the foregoing case, the first condition to the fourth condition in S102 of FIG. 4 become conditions that the current travel time and the travel time of the record are a match in substitute for the current travel distance and the travel distance of the record are a match. Note that, the term "current travel time" is the time that the own vehicle travelled from the time that the ignition switch was most recently turned ON to the current time.

Modified Example 2

In the first embodiment described above, the action history DB 22 may also add a travel time field. The current location of the own vehicle may be used to determine whether the travel time or the travel distance should be used as the condition of determination. For instance, when the own vehicle is located in a residential area or a commercial district with numerous factors that obstruct the travel of the own vehicle, the travel distance may be used as the condition of determination, and when the own vehicle is located in a mountainous area or on an expressway with few factors that obstruct the travel of the own vehicle, the travel time may be used as the condition of determination.

Modified Example 3

In the first embodiment described above, the travel distance field in the action history DB 22 may also store the distance to the destination. In the foregoing case, in the first condition to the fourth condition in S102 of FIG. 4, whether or not the distance to the currently set destination and the travel distance in the action history DB 22 are a match is determined.

Modified Example 4

In the first embodiment described above, the travel distance field in the action history DB 22 may be substituted with the remaining time until arrival field. The remaining time until arrival field stores the time required until reaching the destination from the start of playing of the content. In the foregoing case, in the first condition to the fourth condition in S102 of FIG. 4, whether the remaining time calculated by the navigation unit 15 and the remaining time until arrival of the record are a match is used as the condition in substitution for whether the current travel distance and the travel distance of the record are a match.

According to this modified example, the information processing device 1 can automatically play the content based on the remaining time until reaching the destination. Thus, upon corresponding to the destination match as the foregoing third condition, for instance, it is possible to play the "latest news" as the content indicated in the record 10 minutes before reaching the "workplace" as the destination of the record.

Modified Example 5

In the first embodiment described above, the operation input unit 60 is a button or a touch panel and the user's manual operation was required for the cancel operation. Nevertheless, the operation input unit 60 may also be configured so that it can recognize the user's speech or gesture. For example, the operation input unit 60 can recognize the user's speech by comprising a microphone and a sound recognition function. Moreover, the operation input unit 60 can recognize the user's gesture by comprising a camera and an image processing function. According to this modified example, the user can perform the cancel operation based on a simple operation.

Modified Example 6

The automatic playing unit 13 may add the following fifth condition as the condition of extracting the records in S102 of FIG. 4. The fifth condition is that the current travel distance and the travel distance of the record are a match, and that the current location detected by the own vehicle position detection unit 30 and the playing start location of the record are a match.

The following effects are yielded according to this modified example.

(6) The information processing device 1 comprises an own vehicle position detection unit 30 which calculates the current location of the vehicle. The respective records of the action history DB 22 include the location where the content was played. The automatic playing unit 13 plays the content included in any one of the action histories of the action history DB 22 in which the current travel distance is a match and in which the current location matches the location where the content was played. The information processing device 1 is thereby able to start the automatic playing of a specific content at a specific location.

Modified Example 7

In the first embodiment described above, the automatic playing unit 13 immediately assigned an NG flag based on the cancel operation from the operation input unit 60; that is, wrote "Yes" in the "cancel" field of the history DB 22. Nevertheless, the NG flag may also be assigned when the cancel operation from the operation input unit 60 exceeds a predetermined count. In the foregoing case, the number of times that the cancel operation was received may be counted for each field of the history DB 22, but the number of times that the cancel operation was received for each type of destination and each type of content may also be counted as described below. The type of destination is the category of destination such as restaurant, station, historic landmark or the like. The type of content is the category of content such as news, weather forecast or the like.

FIG. 6A is a table showing the destination and content extracted from the fields of the history DB 22 that received a cancel operation during automatic playing. Each of the fields has received a cancel operation from the operation input unit 60 once. While the destinations shown in FIG. 6A are all different, these destinations are classified into the three types of A, B, and C. Moreover, the contents shown in FIG. 6A are all different, and these contents are classified into the three types of N, M, and W. The automatic playing unit 13 counts the number of times that the cancel operation was received for each type of destination and each type of content.

FIG. 6B is a table showing the count result of the cancel operation for each type of destination and each type of content by the automatic playing unit 13. Note that, the threshold corresponding to the target for assigning the NG flag is set to "2". For example, because the combination of the destination classification A and the content classification N corresponds to the two results of A1–N1 and A2–N2, the total number is "2". Because the combination of the destination classification A and the content classification M only corresponds to the one result of A3–N1, the total number is "1". Because the combination of the destination classification A and the content classification W does not exist in the table of FIG. 6A, the total number is "0". The results are thereby tabulated for each type of destination and each type of content. The automatic playing unit 13 determines that the combination in which the total number is, for instance, "2" or more as corresponding to the target to which the NG flag is assigned. FIG. 6B indicates "Yes" in the column on the right end of the combination corresponding to the target to which the NG flag should be assigned.

The following effects are yielded according to this modified example.

(7) The automatic playing unit 13, as shown in FIG. 6B, counts the number of times that the cancel operation was received for each type of destination of the vehicle upon receiving the cancel operation and for each type of content that was being played upon receiving the cancel operation. The automatic playing unit 13 does not play the content by assigning the NG flag for the combination of the type of destination of the vehicle and the type of content in which the count exceeds a predetermined number. The information processing device 1 is able to thereby determine whether to automatically play the content for each combination of the type of destination and the type of content. To put it differently, even when a cancel operation was not received for a certain record, the information processing device 1 does not automatically play the content based on that record if a cancel operation for the record in which the type of destination and the type of content of that record are the same has been received for a predetermined number of times or more.

Modified Example 8

In the first embodiment described above, the automatic playing unit 13 determined that the condition is a match upon corresponding to any one of the first to fourth conditions in S102 of FIG. 4. Nevertheless, the automatic playing unit 13 may determine whether only one condition, such as the first condition, is a match.

Modified Example 9

The automatic playing unit 13 may also play the content without giving consideration to the length of the content to be automatically played. In other words, the automatic playing unit 13 may proceed to S108 subsequent to S105 of FIG. 4.

Modified Example 10

In the first embodiment described above, the map DB 21, the action history DB 22, and the content DB 23 were stored in the storage unit 20 of the information processing device 1. Nevertheless, at least a part of the foregoing databases may also be stored in a server existing outside the own vehicle. The server is a computer comprising a CPU, a ROM, a RAM, and a nonvolatile storage device such as a hard disk drive. In the foregoing case, the information processing device 1 further comprises a communication unit for performing wireless communication with the server, and accesses information stored in the server via the communication unit. For example, the information processing device 1 may also realize the same functions as the first embodiment by communicating with the server comprising the map DB 21, the action history DB 22, and the content DB 23 in substitute for comprising the map DB 21, the action history DB 22, and the content DB 23.

The server may also realize the functions of the information processing device 1 as follows by reading the programs stored in the ROM into the RAM and executing the programs with the CPU. When the server comprises the map DB 21, the server may concurrently comprise the functions of the navigation unit 15. In the foregoing case, the information processing device 1 does not need to comprise the map DB 21 and the navigation unit 15. When the server comprises the action history DB 22, the server may concurrently comprise the functions of the automatic playing unit 13 and the destination estimation unit 14. In the foregoing case, the information processing device 1 does not need to comprise the action history DB 22, the automatic playing unit 13, and the destination estimation unit 14. When the server comprises the content DB 23, the server may also concurrently comprise the functions of the content playing unit 12. In the foregoing case, the information processing device 1 does not need to comprise the content DB 23 and the content playing unit 12. When the information processing device 1 does not comprise the content DB 23, the information processing device 1 receives the information of fragmented contents or a video signal and a sound signal to be played from the server, and outputs the received information or signal from the display unit 50 and the speaker 70.

Second Embodiment

The second embodiment of the information processing device according to the present invention is now explained with reference to FIG. 7 and FIG. 8. In the ensuing explanation, the same reference numeral is assigned to the constituent elements that are the same as those of the first embodiment, and the differences between the first embodiment and the second embodiment will be mainly explained. Points that are not specifically explained are the same as the first embodiment. This embodiment differs from the first embodiment mainly with regard to the point that the automatic playing is controlled in consideration of the user's load.

(Configuration)

Figure 7:
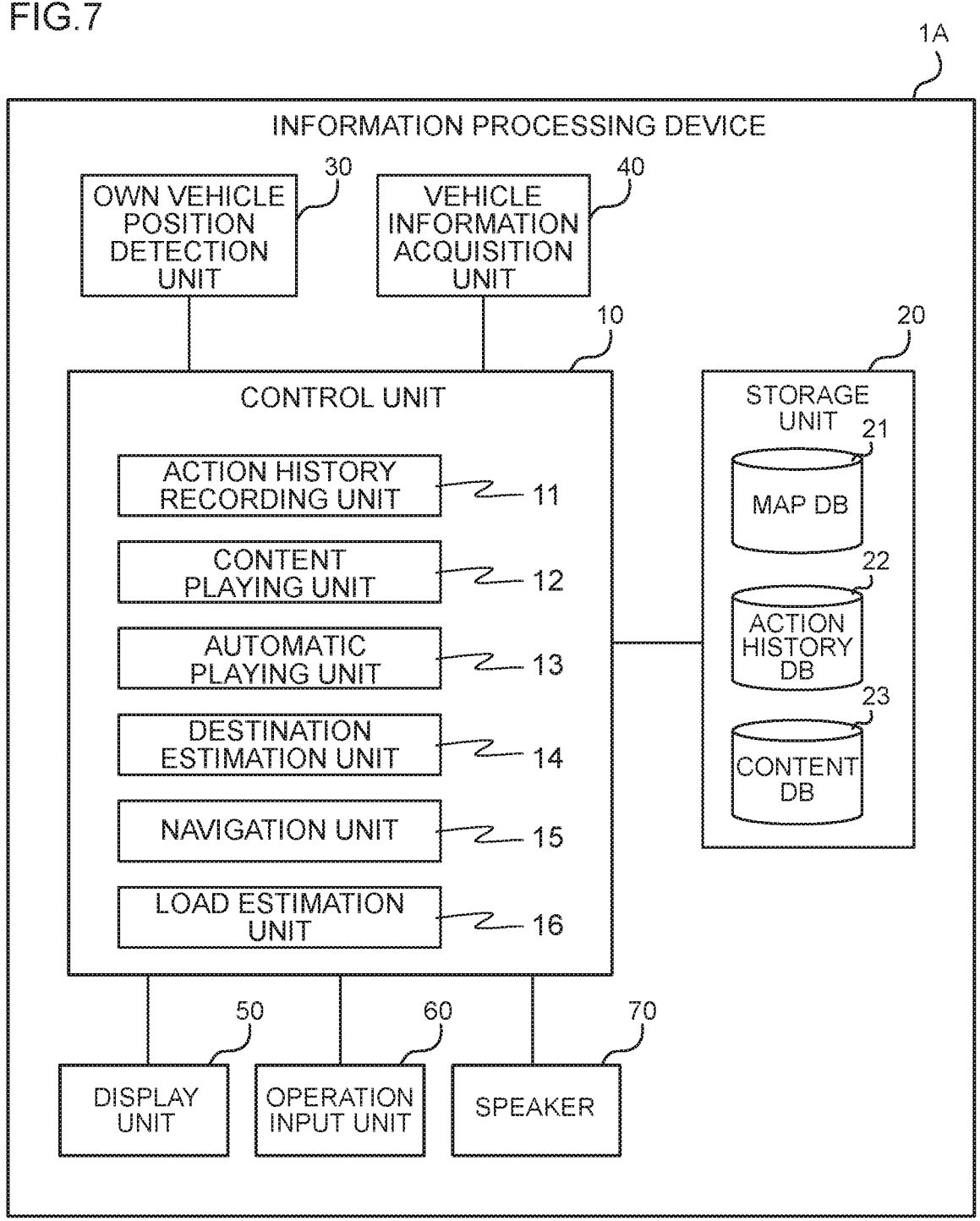
FIG. 7 is a configuration diagram of the information processing device 1A according to the second embodiment.

FIG. 7 is a configuration diagram of the information processing device 1A according to the second embodiment of the present invention. The information processing device 1A shown in FIG. 7 further comprises a load estimation unit 16 and a vehicle information acquisition unit 40 in addition to the configuration of the information processing device 1 in the first embodiment.

The vehicle information acquisition unit 40 is, for example, a communication device connected to a network such as a CAN (Controller Area Network) installed in the own vehicle. The vehicle information acquisition unit 40 acquires information related to the operation of the own vehicle; for instance, information of the own vehicle's speed, acceleration, and steering angle.

The load estimation unit 16 is one function of the control unit 10, and is realized by reading the program stored in the ROM into the RAM and executing the program with the CPU. The load estimation unit 16 estimates the user's load based on information related to the operation of the own vehicle acquired by the vehicle information acquisition unit 40. For example, the load estimation unit 16 determines that the load is small as the speed of the own vehicle is slow, the absolute value of the acceleration is small, and the steering angle is small, and determines that the load is great as the speed of the own vehicle is fast, the absolute value of the acceleration is great, and the steering angle is great. The load estimation unit 16 calculates the size of the load as a numerical value.

(Content Playing Processing)

Figure 8:
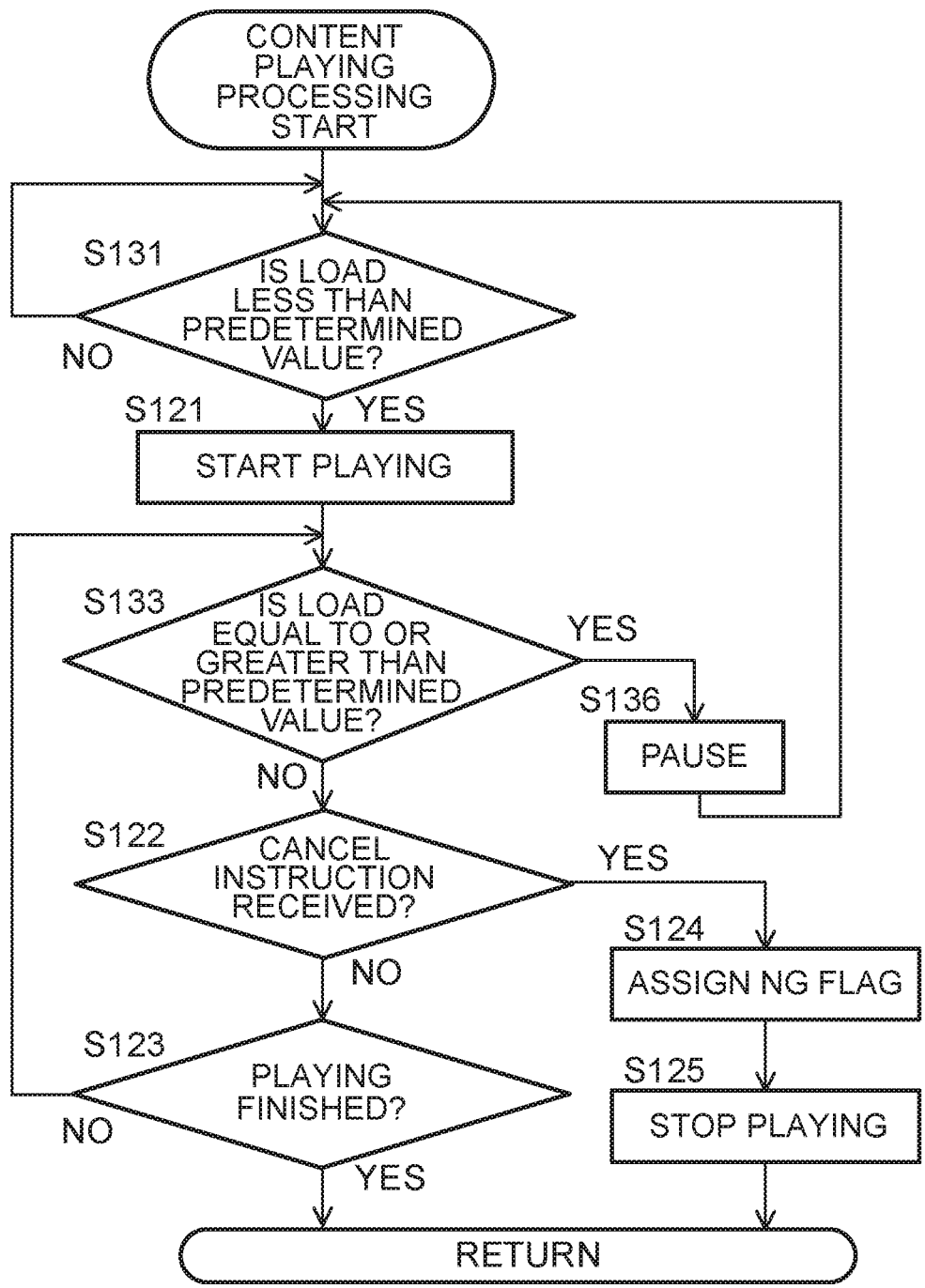
FIG. 8 is a flowchart showing the details of the content playing processing performed in the second embodiment.

FIG. 8 is a flowchart showing the content playing processing performed by the automatic playing unit 13; that is, the operation corresponding to FIG. 5 in the first embodiment. The same operation as FIG. 5 is given the same step number and the explanation thereof is omitted. In the ensuing flowchart, the estimation of the load by the load estimation unit 16 is not specifically explained, but the load is estimated by the load estimation unit 16 as needed.

Foremost, in S131, the automatic playing unit 13 determines whether the load estimated by the load estimation unit 16 is less than a predetermined value. When the automatic playing unit 13 determines that the load is less than a predetermined value, the automatic playing unit 13 proceeds to S121 and starts the playing of the determined content, and the automatic playing unit 13 once again executes S131 upon determining that the load is equal to or greater than a predetermined value. In other words, even when the content playing processing is started, the content is not played until the load becomes less than a predetermined value. In S133, which is executed subsequent to S121, the automatic playing unit 13 once again determines whether the load estimated by the load estimation unit 16 is less than a predetermined value. The automatic playing unit 13 proceeds to S122 upon determining that the load is less than a predetermined value, and proceeds to S136 upon determining that the load is equal to or greater than a predetermined value. In S136, the automatic playing unit 13 pauses the playing of the content and returns to S131. Because the processing of S122 onward is the same as the first embodiment, the explanation thereof is omitted. Note that, when a negative determination is obtained in S123, the automatic playing unit 13 returns to S133.

The following effects are yielded according to the second embodiment described above.

(8) The information processing device 1A comprises a load estimation unit 16 which estimates the load of the user. The automatic playing unit 13 plays the content when the load of the user estimated by the load estimation unit is small. The automatic playing unit 13 is thereby able to automatically play the content in light of the user's load. For instance, when the own vehicle starts rounding a curve, because the absolute value of the acceleration increases and the steering angle increases, the load estimated by the load estimation unit 16 will increase. Subsequently, the automatic playing unit 13 determines that the user's load is greater than the threshold (S133 of FIG. 8: YES) and pauses the playing of the content (S136). While the own vehicle is rounding the curve, the load estimated by the load estimation unit 16 becomes equal to or greater than the threshold (S131: repetition of NO), and the playing of the content is not yet resumed. Once the own vehicle completes rounding the curve and starts traveling straight at a constant speed, because the acceleration and the steering angle are zero, the load estimation unit 16 calculates the user's load to be small, and the automatic playing unit 13 determines that the load is less than the threshold (S131: YES) and resumes the playing of the content (S121).

While the programs of the control unit 10 were stored in the ROM (not shown), the programs may also be stored in the storage unit 20. Moreover, the information processing device 1 may also comprise an I/O interface (not shown), and the programs may be read from another device through a medium that can be used by the I/O interface and the information processing device 1 as needed. Here, the term "medium" refers to, for instance, a storage medium that can be attached to and detached from the I/O interface, or a communication medium such as a wired, wireless or optical network, or carrier waves or digital signals that propagate over the network. Moreover, a part or all of the functions realized by programs may also be realized with a hardware circuit or FPGA.

The respective embodiments and modified examples described above may also be combined. While various embodiments and modified examples were explained above, the present invention is not limited to the contents thereof. The other modes that are conceivable within the range of the technical concept of the present invention also fall within the range of the present invention.

REFERENCE SIGNS LIST 1, 1A . . . information processing device
10 . . . control unit
11 . . . action history recording unit
12 . . . content playing unit
13 . . . automatic playing unit
14 . . . destination estimation unit
15 . . . navigation unit
16 . . . load estimation unit
22 . . . action history DB
23 . . . content DB
30 . . . own vehicle position detection unit
40 . . . vehicle information acquisition unit
50 . . . display unit
60 . . . operation input unit
70 . . . speaker

The invention claimed is:

1. An information processing device installed in a vehicle, comprising:
an action history database (DB), which stores a plurality of action histories including a combination of a content that was played based on an instruction of a user and a situation in which the content was played;
an automatic playing unit which, when a current elapsed time, defined as an elapsed time from a time that an ignition switch of the vehicle was most recently turned on or a current travel distance as a travel distance from a time that an ignition switch of the vehicle was most recently turned on matches any one of the action histories of the action history DB, plays a content included in the matched action history; and
a load estimation unit which estimates a load of the user, wherein
the automatic playing unit plays a content when the load of the user estimated by the load estimation unit is smaller than a predetermined threshold.

2. The information processing device according to claim 1, further comprising:
an operation input unit capable of receiving an input from the user,
wherein, when the operation input unit receives an input while the content is being played, the automatic playing unit suppresses the playing of the content after the operation input unit receives the input.

3. The information processing device according to claim 2,
wherein, when the operation input unit receives an input while the content is being played based on a first action history among the plurality of action histories stored in the action history DB, the automatic playing unit does not play the content based on the first action history after the operation input unit receives the input.

4. The information processing device according to claim 2,
wherein the action history further includes a destination of the vehicle, and
wherein the automatic playing unit counts a number of times the input was received for each type of destination of the vehicle upon receiving the input and for each type of content that was played upon receiving the input, and does not play the content for a combination of the type of the destination of the vehicle and the type of the content in which the count exceeds a predetermined number.

5. The information processing device according to claim 1, further comprising:
a remaining time calculation unit which calculates a remaining time until arrival as a time until reaching a destination,
wherein the automatic playing unit plays a content when a length of the content to be played is shorter than the remaining time until arrival.

6. The information processing device according to claim 1,
wherein the action history further includes a departure place of the vehicle, and
wherein, when the current travel distance and a departure place of the vehicle match any one of the action histories of the action history DB, the automatic playing unit plays a content included in the matching action history.

7. The information processing device according to claim 1, further comprising:
an own vehicle position detection unit which calculates a current location of the vehicle,
wherein the action history further includes a location where the content was played, and
wherein the automatic playing unit plays a content included in any one of the action histories of the action history DB in which the current travel distance is a match and the current location matches the location where the content was played.

8. An automatic playing method of a content executed by an information processing device which is installed in a vehicle and comprises an action history database (DB), which stores a plurality of action histories including a combination of a content that was played based on an instruction of a user and a situation in which the content was played,
wherein, when a current elapsed time defined, as an elapsed time from a time that an ignition switch of the vehicle was most recently turned on or a current travel distance as a travel distance from a time that an ignition switch of the vehicle was most recently turned on matches any one of the action histories of the action history DB, a content included in the matched action history, and
wherein a load of the user is estimated, and a content is played when the load of the user is smaller than a predetermined threshold.

9. The automatic playing method of a content according to claim 8,
wherein the information processing device further comprises an own vehicle position detection unit which calculates a current location of the vehicle,
wherein the action history further includes a location where the content was played, and
wherein a content included in any one of the action histories of the action history DB, in which the current travel distance is a match and the current location matches the location where the content was played, is played.

10. The automatic playing method of a content according to claim 8, wherein, when a signal indicating a cancel operation is input to the information processing device while the content is being played, playing of the content is suppressed.

11. The automatic playing method of a content according to claim 10,
wherein, when the signal is input to the information processing device while the content is being played based on a first action history among the plurality of action histories stored in the action history DB, the content based on the first action history is not played.

12. The automatic playing method of a content according to claim 10,
wherein the action history further includes a destination of the vehicle, and
wherein a number of times the signal was input for each type of destination of the vehicle upon receiving the input and for each type of content that was played upon receiving the input is counted, and the content for a combination of the type of the destination of the vehicle and the type of the content in which the count exceeds a predetermined number is not played.

13. The automatic playing method of a content according to claim 8,
wherein a content is played when a length of the content to be played is shorter than a time until reaching a destination.

14. The automatic playing method of a content according to claim 8,
wherein the action history further includes a departure place of the vehicle, and
wherein, when the current travel distance and a departure place of the vehicle match any one of the action histories of the action history DB, a content included in the matching action history is played.

\* \* \* \* \*